United States Patent [19]

Fresenius

[11] Patent Number: 5,296,142

[45] Date of Patent: Mar. 22, 1994

[54] CHAMBER FILTER PRESS

[75] Inventor: Jürgen Fresenius, Bad Schwalbach, Fed. Rep. of Germany

[73] Assignee: Passavant-Werke AG, Fed. Rep. of Germany

[21] Appl. No.: 21,073

[22] Filed: Feb. 23, 1993

[30] Foreign Application Priority Data

Mar. 20, 1992 [DE] Fed. Rep. of Germany ... 9203784[U]

[51] Int. Cl.$^5$ .............................................. B01D 25/19
[52] U.S. Cl. ..................................... 210/230; 210/224; 100/199
[58] Field of Search ................ 210/230, 224; 100/113, 100/194, 199, 197

[56] References Cited

U.S. PATENT DOCUMENTS 5,194,148 3/1993 Fresenius .......................... 210/230

Primary Examiner—Matthew O. Savage
Attorney, Agent, or Firm—Larson and Taylor

[57] ABSTRACT

A chamber filter press for dewatering waste water or product sludges, comprises a press frame with a number of filter plates movably attached at the head bracket and a crosshead that is hydraulically movable for closing the filter plate bundle. The hydraulic cylinder is supported by a replaceable receptacle device in the form of a flange pipe on the end stand of the press frame. Both flanges of the tubular receptacle device are annular flanges, with dimensions matching the flange of the hydraulic cylinder and they have identical throughbores. The flanges are permitted to pass through the hydraulic cylinder and the end stand has on the attachment side a through-hole for the hydraulic cylinder. The receptacle opening has on the opposite side an installation opening through which the back end of the hydraulic cylinder passes.

5 Claims, 1 Drawing Sheet

CHAMBER FILTER PRESS

FIELD OF THE INVENTION

The invention relates to a chamber filter press for dewatering waste or product sludges.

BACKGROUND OF THE INVENTION

Such chamber filter presses consist of a press frame with two stands and a head bracket and a number of filter plates attached movably at the head bracket. A hydraulically operated crosshead presses the plate bundle together during operation.

Applications exist where the filter press must be operated with a small number of plates in the first removal phase and later must be refitted with additional plates. It is not very logical to construct such a long hydraulic cylinder that it closes each plate bundle used during operation. The piston rod of such a hydraulic cylinder certainly would not be sufficiently buckle-proof.

A remedy to this, that was already suggested, consisted of attaching an extension to the piston rod that is removed again when the plate number is increased. But this does not solve the problem of buckle resistance.

Another suggestion to remedy this problem is to set the hydraulic cylinder onto a tubular receptacle device that is attached removably to the end stand. But this receptacle device also is not the best solution. The reason for this is that it is only possible to set the hydraulic cylinder into a receptacle device that has at least the same length, or to attach it without a receptacle device directly to the end stand. There are no intermediate solutions. The task of finding a remedy for this is solved according to the invention in that both flanges of the tubular receptacle device are annular flanges-with dimensions matching the flange of the hydraulic cylinder and identical through-bores-that permit the passing through of the hydraulic cylinder, and that the end stand has on the attachment side a through-hole for the hydraulic cylinder and on the opposite side an installation opening or through-hole for the hydraulic cylinder.

DETAILED DESCRIPTION OF THE PREFERRED EMBODIMENT

Figure 1:
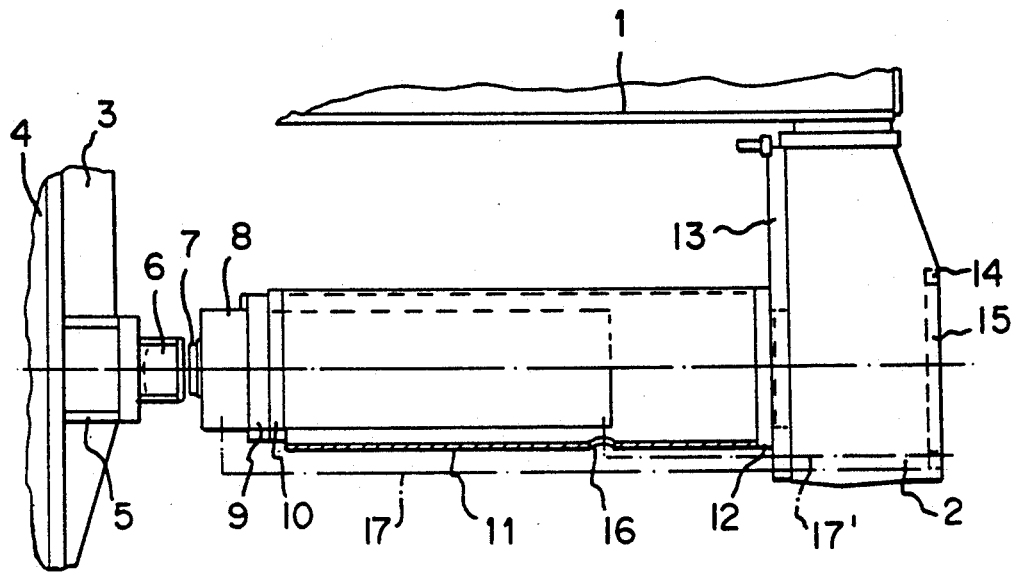
FIG. 1 is a side view of the present invention.
Figure 2:
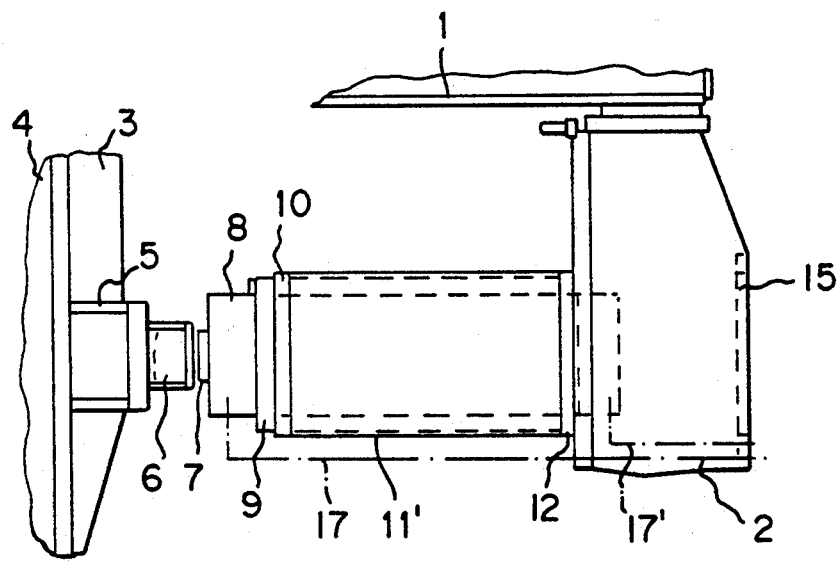
FIG. 2 is a side view similar to FIG. 1 but showing the invention in a different position and with a replaced part.

FIGS. 1 and 2 show a filter press constructed as an embodiment of this invention in two positions of the hydraulic cylinder, whereby only the head bracket 1 and end stand 2 of the press frame are visible, and only the crosshead 3 and the first plate 4 of the plate bundle are visible. The crosshead 3 has a pressure piece 5 to which the head 6 of the piston rod 7 is attached. The hydraulic cylinder 8 itself is screwed with its flange 9 to the exterior annular flange 10 of the tubular receptacle device 11. The back end of the receptacle device is screwed with its ring flange 12 to the attachment side 13 of the end stand 2, whereby the reinforcement 14 at the opposite side of the stand is equipped with an installation opening 15 that can be closed with a cover after use.

With an initial small number of plates (FIG. 1), the receptacle device is so long that the cylinder 8 still ends inside it. For this purpose, the receptacle device has at its back end a bore 16 through which a hydraulic line 17 is passed. The other hydraulic line 17' for retracting the crosshead 3 extends parallel to the cylinder, also through the end stand 2, and ends at its head.

As soon as the filter press is increased by additional filter plates, the receptacle device 11 is detached and replaced with a shorter one 11' (FIG. 2). The latter can be so short that the back end of the hydraulic cylinder projects into the end stand 2 so that the hydraulic line 17 must be connected through installation opening 15. The other hydraulic line 17' is shortened respectively.

The filter press can also be brought immediately to the full number of plates. In this case the receptacle device 11' is completely removed and the hydraulic cylinder is installed at the end stand. It then projects through the installation opening 15 to the outside (not shown).

I claim:

1. A chamber filter press for dewatering of waste water sludge comprising a head bracket and an end stand connected thereto, a plurality of filter plates movably suspended from said head bracket, a crosshead for closing the plurality of filter plates and a hydraulic cylinder having a front end attached to said crosshead for moving said crosshead, said front end of said hydraulic cylinder having a flange attached thereto, said end stand having front and rear sides, said filter press further comprising a removable receptacle device for receiving the hydraulic cylinder, said receptacle device comprising a tube with first and second annular end flanges, said first and second end flanges having through-bores dimensioned to receive said hydraulic cylinder, means for attaching said front annular end flange to said flange on said hydraulic cylinder, means for attaching said second annular end flange to the front side of said end stand, said front side of said end stand having a through hole through which the hydraulic cylinder passes, said rear side of said end stand having an opening dimensioned to allow a rear end of said hydraulic cylinder to pass therethrough.

2. The chamber filter recited in claim 1 wherein the front end of said hydraulic cylinder comprises a piston.

3. The chamber filter recited in claim 2 wherein said piston is attached to said crosshead by means of a pressure piece.

4. The chamber filter recited in claim 1 wherein said head bracket is capable of receiving a varying number of filter plates.

5. The chamber filter recited in claim 4 wherein said end stand in equipped to receive receptacle devices having different lengths depending on the number of filter plates mounted on said head bracket.

* * * * *